United States Patent [19]

Lee et al.

[11] Patent Number: 4,994,980
[45] Date of Patent: Feb. 19, 1991

[54] AUTOMATIC MACHINING SCHEDULING METHOD BASED ON AN EXPERT SYSTEM

[75] Inventors: Bong J. Lee, Yamanashi; Ryoji Yokomori, Nirasaki, both of Japan

[73] Assignee: Fanuc Ltd., Minamitsuru, Japan

[21] Appl. No.: 335,538

[22] PCT Filed: Sep. 2, 1988

[86] PCT No.: PCT/JP88/00886

§ 371 Date: Mar. 24, 1989

§ 102(e) Date: Mar. 24, 1989

[87] PCT Pub. No.: WO89/02341

PCT Pub. Date: Mar. 23, 1989

[30] Foreign Application Priority Data

Sep. 9, 1987 [JP] Japan .................. 62-223855

[51] Int. Cl.$^5$ ............................................. G06F 15/46
[52] U.S. Cl. ........................ 364/474.15; 364/474.11; 364/148; 364/513
[58] Field of Search .................. 364/468, 469, 474.01, 364/474.11, 474.13, 474.15, 474.16, 474.25, 513, 300, 200, 400, 138, 148, 149, 551.02; 29/568

[56] References Cited

U.S. PATENT DOCUMENTS 4,472,783 9/1984 Johnstone et al. .................. 364/468
4,473,883 9/1984 Yoshida et al. ..................... 364/468
4,583,280 4/1986 Corrigan et al. ................ 364/474.11
4,661,912 4/1987 Imanishi ............................ 364/468
4,896,269 1/1990 Tong .................................. 364/468

Primary Examiner—Jerry Smith
Assistant Examiner—Paul Gordon
Attorney, Agent, or Firm—Staas & Halsey

[57] ABSTRACT

An automatic machining scheduling method based on an expert system is provided, which can optimize and facilitate the assignment of processes in a large-scale production system to individual machine tools, based on expert experience accumulated as a database, thereby enabling effective operation of the production system. When requested quantities for respective machine models to be produced are input (S1), the machining time of each jig involved in a respective machine model and the usage form of each jig are read from the related files, and the former is multiplied by the latter, to obtain the total machining time for each of the machine tools (S2, S3). A day or week production matrix is created based on the ratio of the calculated time of each of the machine tools to the operating time thereof per day (S4–S7). It is determined whether a machining schedule including a pattern identical to the machining pattern of the matrix is registered (S10, S11). If the machining schedule is registered in the file, the registered schedule is used (S12–S15).

5 Claims, 6 Drawing Sheets

FIG. 2

| JIG NO. | SPECIFICATION | ARTICLE | MODEL | PROCESS | MOUNTING NUMBER | NUMBER REQUIRED | PROGRAM NO. | NUMBER OF TOOLS (RATIO) | F1 | TOTAL NUMBER OF TOOLS | TOTAL MACHINING TIME (RATIO) | TOTAL MACHINING TIME | WEIGHT OF WORKPIECE (kg) |
|---|---|---|---|---|---|---|---|---|---|---|---|---|---|
| 860601 | A290-5204-X001 | A1 | MS1 | 1 | 1 | 1 | 3100 | 30 (0.52) | 58 | | 445 | | 338 |
| | A290-5204-X003 | A2 | MS1 | 1 | 1 | 1 | 2100 | 20 (0.35) | | | | | 336 |
| | A290-5204-X005 | A3 | MS1 | 1 | 2 | 4 | 5350 | 8 (0.14) | | | | | 14 |
| 860602 | A290-5204-X002 | A4 | MS1 | 2 | 1 | 1 | 3200 | 13 (0.25) | 51 | | 350 | | 338 |
| | A290-5204-X006 | A5 | MS1 | 2 | 1 | 1 | 2200 | 29 (0.57) | | | | | 336 |
| | A290-5204-X007 | A6 | MS1 | 1 | 4 | 4 | 5700 | 9 (0.17) | | | | | 2.3 |
| 860603 | --- | A7 | MS1 | 3 | 1 | 1 | 3300 | 18 (0.34) | 53 | | 410 | | 338 |
| | --- | A8 | MS1 | 3 | 1 | 1 | 2300 | 23 (0.43) | | | | | 336 |
| | --- | A9 | MS1 | 1 | 4 | 4 | 5500 | 12 (0.23) | | | | | 8 |
| 860604 | --- | A10 | MS1 | 1 | 1 | 1 | 1100 | 15 (0.35) | 43 | | 500 | | 307 |
| | --- | A11 | MS1 | 2 | 4 | 4 | 5600 | 6 (0.13) | | | | | 8 |
| | --- | A12 | MS1 | 2 | 4 | 4 | 5400 | 10 (0.23) | | | | | 14 |
| | --- | A13 | MS1 | 2 | 4 | 4 | 5800 | 12 (0.28) | | | | | 2.3 |
| 860605 | --- | A14 | MS2 | 2 | 1 | 1 | 1200 | 32 (0.51) | 63 | | 440 | | 307 |
| | --- | A15 | MS2 | 3 | 1 | 1 | 1300 | 23 (0.37) | | | | | 307 |
| | --- | A16 | MS2 | 1 | 2 | 4 | 5300 | 8 (0.13) | | | | | 14 |

F1 values (in Number of Tools column area): 255 (0.57), 140 (0.31), 25×2 (0.11), 100 (0.29), 160 (0.46), 23×4 (0.26), 90 (0.22), 180 (0.44), 35×4 (0.34), 160 (0.32), 23×4 (0.18), 33×4 (0.26), 30×4 (0.24), 220 (0.50), 170 (0.33), 25×2 (0.11)

| SEQ | PATTERN | MS1 | MS2 | MS3 | MS4 | MS5 | MS6 | MS7 |
|---|---|---|---|---|---|---|---|---|
| 1 | PA1 | 1 | 1 | 0 | 1 | 0 | 0 | 1 |
| 2 | PA2 | 1 | 2 | 1 | 3 | 3 | 2 | 1 |
| 3 | PA3 | 1 | 3 | 1 | 3 | 2 | 3 | 1 |
| 4 | PA4 | 2 | 1 | 1 | 1 | 2 | 2 | 1 |
| 5 | PA5 | 2 | 2 | 1 | 3 | 3 | 2 | 1 |
| 6 | . | | | | | | | |
| 7 | . | | | | | | | |
| 8 | . | | | | | | | |
| 9 | . | | | | | | | |
| 10 | . | | | | | | | |
| 11 | . | | | | | | | |
| 12 | . | | | | | | | |
| 13 | . | | | | | | | |
| 14 | | | | | | | | |
| 15 | | | | | | | | |

PATTERN = PA1

|  | 1 | 2 | 3 | 4 | 5 |
|---|---|---|---|---|---|
| K24 | 860601 | 860602 | 860603 | 860604 | 860605 |
|  | 860601 | 860602 | 860603 | 860604 | 860605 |
|  | 860601 | 860602 | 860603 | 860604 | 860605 |
|  | 860606 | 860607 | 860608 | 860609 | 860610 |
|  | 860606 | 860607 | 860608 | 860609 | 860610 |

|  | 1 | 2 | 3 | 4 | 5 |
|---|---|---|---|---|---|
| K25 | 860611 | 860612 | 860613 | 860614 | 860615 |
|  | 860611 | 860612 | 860613 | 860614 | 860615 |
|  | 860611 | 860612 | 860613 | 860614 | 860615 |
|  | 860616 | 860617 | 860618 | 860619 | 860610 |
|  | 860616 | 860617 | 860618 | 860619 | 860610 |

|  | 1 | 2 | 3 | 4 | 5 |
|---|---|---|---|---|---|
| K26 | 860621 | 860622 | 860623 | 860624 | 860625 |
|  | 860621 | 860622 | 860623 | 860624 | 860625 |
|  | 860626 | 860627 | 860628 | 860629 | 860620 |
|  | 860626 | 860627 | 860628 | 860629 | 860620 |

FIG. 5

PATTERN = PA1    CELL NO. = K24

| JOB | PN | JIG | SPECIFICATION | ARTICLE | PROGRAM NO. | PROCESS | RQ | SQ |
|---|---|---|---|---|---|---|---|---|
| 1 | 1 | 860601 | A290-5204-X001 | A1 | 3100 | 00-01 | 1 | 100 |
| 2 | | | A290-5204-X003 | A2 | 2100 | 00-01 | 1 | 200 |
| 3 | | | A290-5204-X005 | A3 | 5350 | 00-01 | 4 | 130 |
| 4 | 2 | 860602 | A290-5204-X002 | A4 | 3200 | 01-02 | 1 | 100 |
| 5 | | | A290-5204-X006 | A5 | 2200 | 01-02 | 1 | 50 |
| 6 | 3 | 860603 | — | — | — | — | — | — |
| 7 | | | | | | | | |
| 8 | 4 | 860604 | | | | | | |
| 9 | 5 | 860605 | | | | | | |
| 10 | 1 | 860601 | | | | | | |
| 11 | | | | | | | | |
| 12 | | | | | | | | |
| 13 | | | | | | | | |
| 14 | 2 | 860602 | | | | | | |
| 15 | | | | | | | | |

|      | B | C | E | F | TOTAL |
|------|---|---|---|---|-------|
| MS1  | 1 | 0 | 0 | 0 | 1 |
| MS2  | 0 | 1 | 0 | 0 | 1 |
| MS3  | 0 | 0 | 0 | 0 | 0 |
| MS4  | 1 | 0 | 0 | 0 | 1 |
| MS5  | 0 | 0 | 0 | 0 | 0 |
| MS6  | 0 | 0 | 0 | 0 | 0 |
| MS7  | 0 | 1 | 0 | 0 | 1 |
| TOTAL| 2 | 2 | 0 | 0 | 4 |

FIG. 7

|      | B | C | E | F | TOTAL |
|------|---|---|---|---|-------|
| MS1  | 1 | 0 | 1 | 0 | 2 |
| MS2  | 0 | 1 | 0 | 0 | 1 |
| MS3  | 0 | 0 | 0 | 1 | 1 |
| MS4  | 1 | 0 | 0 | 0 | 1 |
| MS5  | 0 | 2 | 0 | 0 | 2 |
| MS6  | 2 | 0 | 0 | 0 | 2 |
| MS7  | 0 | 1 | 0 | 0 | 1 |
| TOTAL| 4 | 4 | 1 | 1 | 10 |

AUTOMATIC MACHINING SCHEDULING METHOD BASED ON AN EXPERT SYSTEM

BACKGROUND OF THE INVENTION

The present invention relates to an automatic machining scheduling method which enables an effective operation or practical usage of a large-scale production system for manufacturing various models of machines.

In producing various component parts for machine products, a machining schedule is conventionally planned humanly so as to be optimized. It is, however, the expense of much labor and time to create an optimum machining schedule humanly each time when required, in order to effectively operate a large-scale production system for manufacturing various models of machines in large quantities.

There has conventionally been proposed an automatic scheduling method for creating a machining schedule without requiring manpower. However, this proposed method is applicable only to a case where the number of machine tools used for machining component parts is as small as three or less and the number of component parts to be produced is also small. Moreover, the method is based on a formula which is too logical and mathematical. Thus, it is difficult to use the method for operation of a large-scale production system.

SUMMARY OF THE INVENTION

The object of the present invention is to provide an automatic machining scheduling method based on an expert system, which can optimize and facilitate the assignment of processes in a large-scale production system for mass-producing various machine products, to individual machine tools for producing various component parts of the products, by effectively utilizing expert experience and know-how accumulated as a database, thereby enabling effective operation of the large-scale production system.

To achieve the object, the present invention provides an automatic machining scheduling method based on an expert system, which comprises the steps of: (a) obtaining a total machining time required for each of machine tools to machine various component parts of machines to be produced, based on requested quantities of respective machine models; (b) comparing the required total machining time of each of the machine tools, obtained in the step (a), with a predetermined operating time for the corresponding machine tool per a first predetermined period, and determining whether the first predetermined period or a second predetermined period longer than the first predetermined period should be used as a unit time for creating a machining schedule; (c) creating a production matrix in accordance with the unit time determined in the step (b) and based on the request quantities of respective machine models; (d) retrieving a machining pattern coinciding with the production matrix created in the step (c), from among various machining patterns registered previously; and (e) retrieving a machining schedule corresponding to the machine pattern retrieved in the step (d), from among various machining schedules registered previously.

According to the invention, the optimum machining schedule is retrieved from among those previously registered according to requested quantities for individual models of products; in other words, expert experience and know-how are effectively utilized with the aid of an expert system having artificial intelligence functions. Hence, an optimum machining schedule can be easily prepared, and the large-scale production system can be used practically in an effective manner.

BRIEF DESCRIPTION OF THE DRAWINGS

FIG. 2 is a diagram showing part of a format of a master file used in the embodiment;

FIG. 3 is a diagram showing part of a format of a pattern file used in the embodiment;

FIG. 4 is a diagram showing part of a format of a jig pattern file used in the embodiment;

FIG. 5 is a diagram showing part of format of a machining command file used in the embodiment;

FIG. 6 is a diagram showing an example of a day production matrix used in the embodiment; and FIG. 7 is a diagram showing an example of a week production matrix.

DESCRIPTION OF THE PREFERRED EMBODIMENTS

Figure 1A:
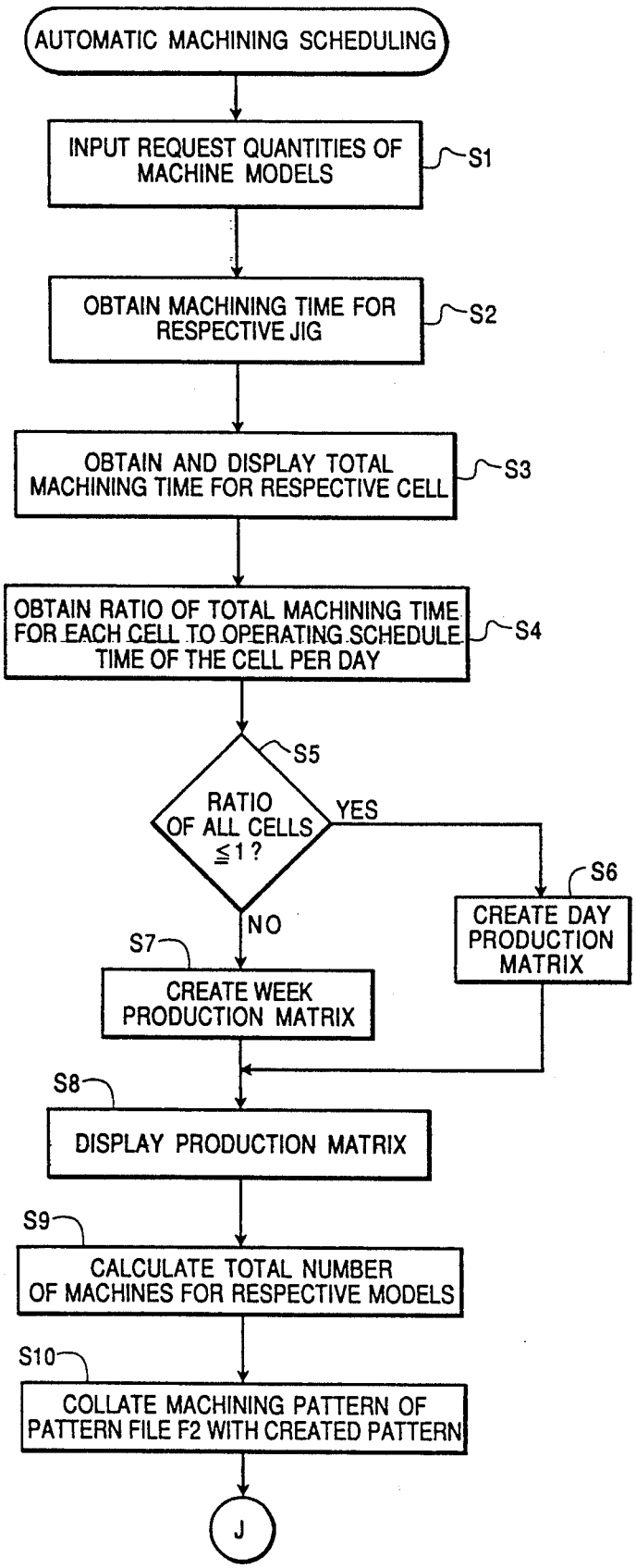
FIGS. 1A and 1B form a flowchart of a control program for executing an automatic machining scheduling method according to one embodiment of the invention.

An automatic machining scheduling method according to one embodiment of the present invention will now be described.

According to this embodiment, in order to utilize the experience and know-how of experts in charge of designing an optimum machining schedule, various files in which such experience and know-how are accumulated as a database, i.e., master files F1, pattern files F2, jig pattern files F3, machining command files F4 (FIGS. 2 to 5, respectively), and files for decision of cell total machining time (designated hereinafter by "F5" for convenience sake, though illustration is omitted), are stored in a memory of a computer (not shown). The format of each file will be explained first.

Referring to FIG. 2, the master file F1 includes fields for various setting items, and in these fields are stored predetermined information expressed in a predetermined number of digits composed of alphabetic letters and/or numerals.

More specifically, the field "JIG" in the file F1 stores the indentification number of jigs (only the numbers "860601" to "860605" are shown and the following numbers are omitted), and the field "SPECIFICATION" stores the specifications of component parts as an abbreviated identification number of a to-be-machined workpiece (component part) mounted to the corresponding jig. As illustrated in FIG. 2, for each jig, a set of information relating to plural component parts are generally stored in the "SPECIFICATION" field and the below-mentioned fields. The field "ARTICLE" of the master file F1 stores article codes A1, ... A16, ... of the above component parts, and the field "MODEL" stores information on the models of machines MS1, ... MS16, ..., which are composed of the component parts. The field "PROCESS" stores the number of processes for the individual component parts, the field "MOUNTING NUMBER" stores the number of component parts to be mounted to the corresponding jig, and the field "NUMBER REQUIRED" stores the necessary number of component parts for respective jigs. The field "PROGRAM NO." stores a number specifying the program used for machining the corresponding component part, and the field "NUM- BER OF TOOLS" stores the number of tools used for machining the component part and the ratio of this number to the total number of tools, mentioned later (given in parentheses). The field "TOTAL NUMBER OF TOOLS" stores the total number of all the tools used with the corresponding jig. The field "MACHINING TIME" stores the machining time required for machining the component part, and the ratio (given in parentheses) between this machining time and the total machining time, mentioned later. The field "TOTAL MACHINING TIME" stores the total machining time required for machining all the related component parts by the jig, and the field "WEIGHT OF WORKPIECE" stores the weight of the component part as a workpiece.

Now referring to FIG. 3, the pattern file F2 is provided with a field "PATTERN" for storing the names of machining patterns (only "PA1" to "PA5" are shown), and seven fields "MS1" to "MS7" for storing the request numbers to be produced for respective models of machines "MS1" to "MS7". Namely, the file F2 stores therein various patterned combinations each of which represents one or more models of machines to be produced and the requested number of products for each model. For example, the machining pattern "PA1" indicates a pattern for producing machines "MS1", "MS2", "MS3", "MS4", and "MS7", one for each, while the machining pattern "PA2" shows a pattern for producing one for each of "MS1" and "MS7", two for each of "MS2" and "MS6", and three for each of "MS4" and "MS5".

The jig pattern file F3 stores information as to what jigs should be used and as to how these jigs should be used for individual cells (machine tools) used for machining according to their respective machining patterns, namely, the file stores the usage form of jigs. As illustrated in FIG. 4 showing part of the file F3, this file F3 has a field for storing the name of machining pattern (i.e., pattern "PA1" in FIG. 4), a field for storing the names of cells associated with the machining pattern (cells "K24" to "K26" in FIG. 4), and a field for storing the kinds of jigs used during cell execution, in relation to a pallet to which the jigs are mounted. The last-mentioned field is, for example, in the form of a matrix comprising six rows and five columns, and the five numerals "1" to "5" along the row denote the pallet pool numbers.

Here, the usage of the jig associated with the cell "K24" in the machining pattern "PA1" will be explained. First, the jigs "860601" to "860605" mounted respectively to the pallets indicated by the pallet pool numbers "1" to "5" are used three times in a row in the order mentioned. Then, in place of these jigs, the jigs "860606" to "860610", mounted to the pallets indicated by the numbers "1" to "5" are used two times.

The machining command file F4 stores therein machining schedules for respective cells used for machining according to their corresponding machining patterns. As shown in FIG. 5 in which part of the file F4 is illustrated, the file F4 has various fields for storing the name of machining pattern (the machining pattern "PA1" in FIG. 5), the name of the cell relating to the pattern concerned (the cell "K24" in FIG. 5), and information on the machining processes carried out sequentially in each cell. The last-mentioned field comprises a field "JOB" for storing the number representing the content of an operation performed in respective machining processes, a field "PN" for storing the aforesaid pallet pool number, and, like the file shown in FIG. 2, fields "JIG", "SPECIFICATION" and "PROGRAM NO." This machining process information field further includes a field "PROCESS" for indication of a pre-or post-stage process, a field "RQ" for indicating the number of machining commands, and a field "SQ" for indicating the number of products stocked in the warehouse.

In addition to the above-described files F1 to F4, the aforementioned cell total machining time decision file F5 is stored in the computer memory, though omitted from the drawings. The file F5 includes first and second files which are similar to the aforementioned files F2 and F3, respectively.

Figure 1B:
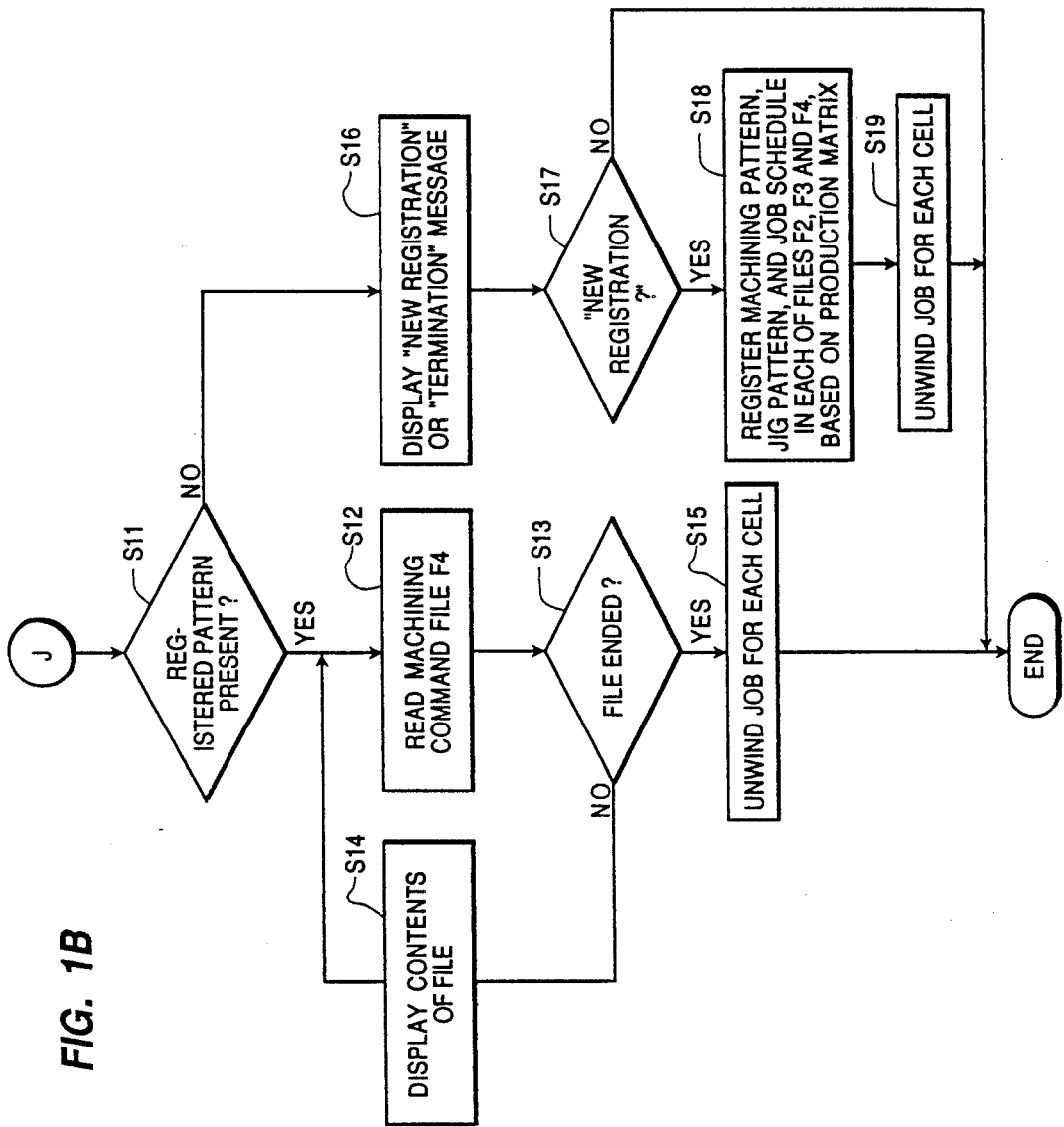

Now referring to FIGS. 1A and 1B, the automatic machining scheduling method utilizing the above-described files F1 to F5 will be explained.

First, an operator inputs the requested quantities for individual models of machines, more specifically, the machine models to be produced, the machine types specifying the machine models in more detail (represented by the symbols "B", "C", "E", and "F" as mentioned later), and the number of machines of each type to be produced, to the computer (Step S1).

Upon receiving the input data, the computer refers to the file F1, to obtain the machining time for each of the jigs involved in the respective machine models to be produced, by reading out the information stored in the field "TOTAL MACHINING TIME" of the file F1 relating to the individual jigs (Step S2).

Although not illustrated, Step S2 is followed by a processing which is not pertinent to the present invention, wherein the machining time for each jig, obtained in Step S2, is multiplied by the number of machines of those models relating to this jig, to obtain the total machining time for each of the jigs, and the total machining times of various jigs involved in the same machine model are summed to obtain a total machining time for each model.

Then, based on the requested quantities for individual machine models input in Step S1, the computer creates a tentative production pattern similar to the above-mentioned pattern file F2. Next, by referring to the first file (corresponding to the file F2) of the cell total machining time decision file F5, the computer searches for a production pattern that coincides with the tentative production pattern, from among those stored in the first file, and identifies the pattern name. Then, the computer refers to the second file (corresponding to the file F3) of the file F5, to obtain the number of times the jigs are used, on the basis of the usage form of the jigs for operation of a corresponding one of the cells associated with the tentative production pattern. The machining time for each jig, obtained in Step S2, is multiplied by the number of times this jig is used, thereby obtaining the total machining time for each jig, and the total machining times of the jigs involved in one cell are summed up to obtain the total machining time of each cell. The computer stores the obtained information into the memory and at the same time displays on a CRT display (Step S3).

Subsequently, the computer calculates the ratio of the total machining time for each cell, obtained in Step S3, to a first predetermined time for each cell, e.g., a predetermined operating period per day, namely, the computer calculates the load rate for each cell (Step S4). The computer then judges whether the obtained ratio of each cell is smaller than "1" (Step S5). When all the ratios are smaller than "1", the computer creates a day production matrix, based on the numbers of products of the respective models and types input in Step S1 (Step S6). FIG. 6 shows an example of a day production matrix created in this manner. The example illustrates the case of manufacturing type B of MS1, type C of MS2, type B of MS4, and type C of MS7, one for each type.

If one or more of the above-mentioned ratios are determined to be greater than "1" in Step S5, the computer creates a week production matrix (Step S7). FIG. 7 shows an example of the week production matrix, which shows the case of manufacturing type B of MS1, type E of MS1, type C of MS2, type F of MS3, type B of MS4, and type C of MS7, respectively one for each type, and type C of MS5 and type B of MS6, two for each type, respectively. The production matrix created in Step S6 or S7 is displayed on the CRT screen (Step S8).

Then, the computer calculates the total number of products for each machine model in the day or week production matrix created in Step S6 or S7, i.e., the values to be shown in the field "TOTAL" in FIG. 6 or 7 (Step S9). The pattern of total numbers for respective machine models, obtained in this manner, are collated with various machining patterns PA1, PA2, . . . of the pattern file F2 stored in the memory (Step S10). It is then determined whether a pattern coinciding with the created pattern is already registered in the pattern file F2 (Step S11). For example, the pattern "1100101" of the production matrix shown in FIG. 6 is identical with the machining pattern PA1 already registered in the pattern file F2, and the pattern "2111221" of the production matrix shown in FIG. 7 is identical with the machining pattern PA4 already registered in the pattern file F2.

When the matrix pattern created in Step S6 or S7 is already registered in the pattern file F2, machining schedules for respective cells associated with a machining pattern that is identical to the above-mentioned machining pattern (i.e., the machining pattern PA1 in FIG. 6, and the machining pattern PA4 in FIG. 7) are read from the machining command file F4, and are sequentially displayed on the CRT screen (Steps S12, S13, and S14). The individual machining schedules of the machining patterns read from the machining command file F4 in this manner, i.e., the jobs (JOB) for the respective cells, are unwound, and are stored in the working storage areas of the memory or output to a cell controller for controlling the respective cell (Step S15), thus completing the automatic scheduling operation.

If, in Step S11, it is judged that no machining pattern corresponding to the production matrix created in Step S6 or S7 exists in the pattern file F2, a message inquiring whether the pattern should be newly registered or the program should be terminated is displayed on the CRT screen (Step S16). If the program termination command is input, the execution of the program is naturally terminated. If the new pattern registration command is input (Step S17), the machining pattern of the production matrix is first registered in the pattern file F2. Subsequently, the usage form of the jigs in the corresponding machining pattern is determined by referring to the cell total machining time decision file F5, and the resulting data is registered in the jig pattern file F3. Then, job (JOB) schedules are created for respective cells of the machining pattern, referring to the registered file F3 and the master file F1, and are registered in the machining command file F4 (Step S118). Next, the jobs (JOB) for the respective cells, registered in the machining command file F4, are displayed on the CRT display, and are stored in the working storage areas of the memory or output to the cell controllers (Step S19). In this manner the automatic scheduling is completed.

What is claimed is:

1. An automatic machining scheduling method based on an expert system, comprising the steps of:
   (a) obtaining a total machining time required for each of a plurality of machine tools to machine various component parts of machines to be produced, based on requested quantities of respective machine models;
   (b) comparing the required total machining time of each of the machine tools, obtained in said step (a), with a predetermined operating time for the corresponding machine tool per a first predetermined period, and determining whether the first predetermined period or a second predetermined period longer than the first predetermined period should be used as a unit time for creating a machining schedule;
   (c) creating a production matrix in accordance with the unit time determined in said step (b) and based on the requested quantities of respective machine models;
   (d) retrieving a machining pattern coinciding with the production matrix created in said step (c), from among various machining patterns registered previously; and
   (e) retrieving a machining schedule corresponding to the machining pattern retrieved in said step (d), from among various machining schedules registered previously.

2. An automatic machining scheduling method according to claim 1, wherein the first and second predetermined periods are set respectively to one day and one week.

3. An automatic machining scheduling method according to claim 1, wherein usages of various jigs for respective machine tools used for executing patterns representing quantities of respective machine models to be produced are previously registered in relation to the respective patterns, a machining time for each of the jigs used for producing respective machine models is registered previously and wherein said step (a) comprises obtaining the required total machining time for the respective machine tool based on the usage forms of the various jigs and the machining times registered previously.

4. An automatic machining scheduling method according to claim 2, wherein usages of various jigs for respective machine tools used for executing patterns representing quantities of respective machine models to be produced are previously registered in relation to the respective patterns, a machining time for each of the jigs used for producing respective machine models is registered previously and wherein said step (a) comprises obtaining the required total machining time for the respective machine tool based on the usage forms of the various jigs and the machining times registered previously.

5. An automatic machining scheduling method, comprising the steps of:
   (a) registering a plurality of machining patterns;
   (b) registering a plurality of machining schedules corresponding to the machining patterns;

(c) determining a total machining time required for each of a plurality of machine tools to manufacture a requested quantity of machines having respective machine models;

(d) comparing the total machining time of each of the machine tools determined in said step (c) with a predetermined operating time for the corresponding machine tool to determine whether a first predetermined period or second predetermined period which is longer than the first predetermined period, should be used as a unit time for creating a machining schedule;

(e) creating a production matrix based on the requested quantities of respective machine models and the unit time determined in said step (d);

(f) retrieving one of the registered machining patterns corresponding to the production matrix created in said step (e); and (g) retrieving one of the registered machining schedules corresponding to the machining pattern retrieved in said step (f).

* * * * *